United States Patent [19]
Coulthard

[11] Patent Number: 5,825,286
[45] Date of Patent: Oct. 20, 1998

[54] VEHICULAR DATA COLLECTION AND TRANSMISSION SYSTEM AND METHOD

[75] Inventor: John J. Coulthard, Scottsdale, Ariz.

[73] Assignee: SemiSystems, Inc., Scottsdale, Ariz.

[21] Appl. No.: 692,117

[22] Filed: Aug. 5, 1996

Related U.S. Application Data

[63] Continuation-in-part of Ser. No. 436,167, May 8, 1995, Pat. No. 5,656,993.

[51] Int. Cl.$^6$ .................................................. B60C 23/00
[52] U.S. Cl. ......................... 340/447; 340/442; 340/445; 73/146.5
[58] Field of Search .................................... 340/442, 445, 340/431, 447; 73/146.4, 146.5, 146.8

[56] References Cited

U.S. PATENT DOCUMENTS

| | | |
|---|---|---|
| 4,254,312 | 3/1981 | Migrin et al. ........................... 73/146.8 |
| 4,717,905 | 1/1988 | Morrison, Jr. et al. ................. 340/447 |
| 5,274,355 | 12/1993 | Galan ....................................... 340/444 |
| 5,335,540 | 8/1994 | Bowler et al. ........................... 340/447 |
| 5,359,886 | 11/1994 | Pradelle .................................. 340/442 |
| 5,589,815 | 12/1996 | Nishihara et al. ....................... 340/442 |

*Primary Examiner*—Edward Lefkowitz
*Attorney, Agent, or Firm*—Woodbridge & Associates

[57] ABSTRACT

Selected vehicle operational parameters such as tire pressure, wheel temperature and vibration are sensed by sensors mounted on wheel modules secured to the individual vehicle wheels. The sensed parameters are converted to digital format and the resulting digital data is manipulated to determine if the data falls within predetermined operating ranges. The data and information resulting from the manipulation are used to modulate an RF signal transmitted to another location on the vehicle. Additional parameters are sensed at the second location, and calculations are performed on the data received from the wheel modules and the data sensed at the second location to display operational, efficiency and safety information to the vehicle operator and to make such information available to others such as vehicle owners and maintenance personnel.

36 Claims, 7 Drawing Sheets

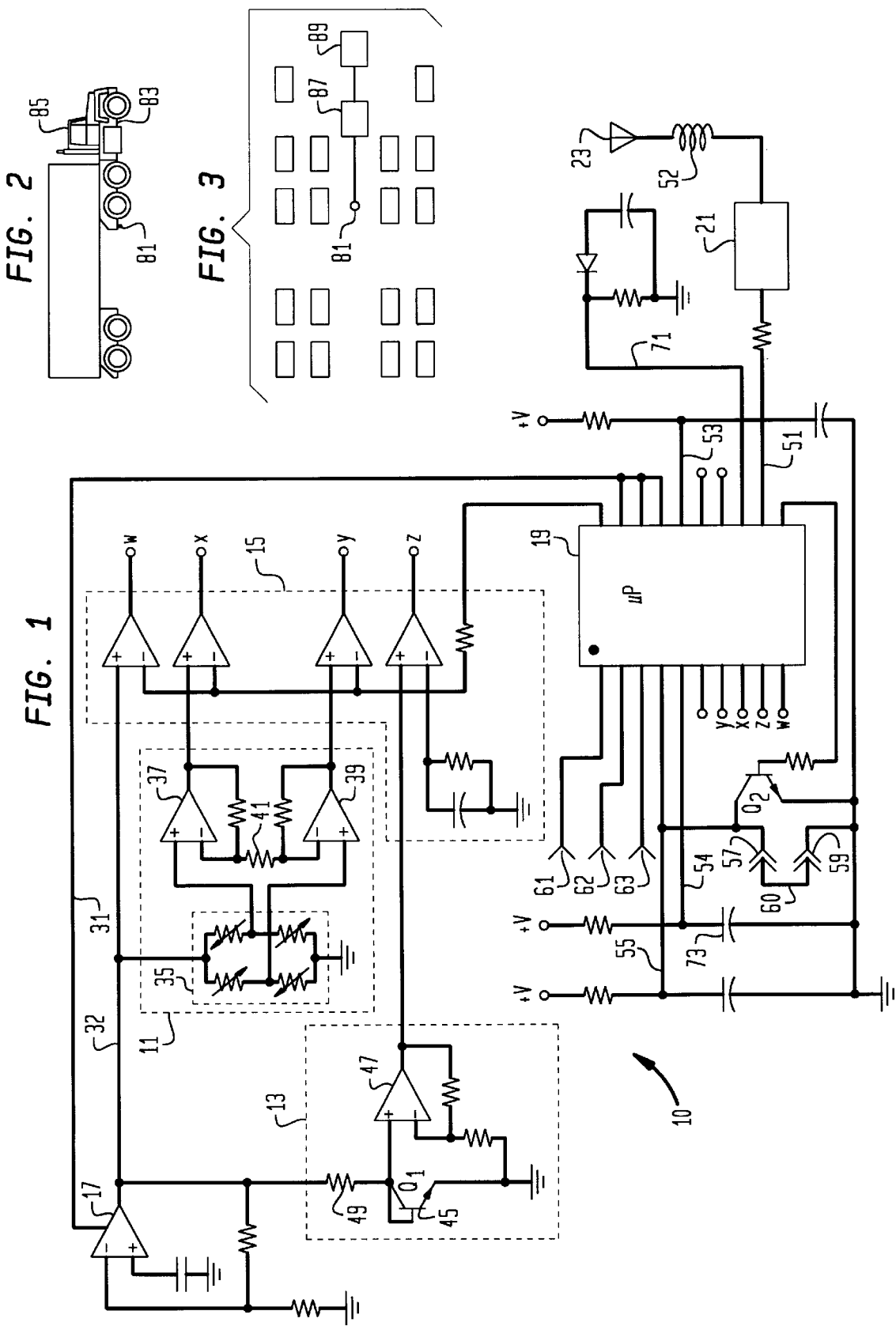

VEHICULAR DATA COLLECTION AND TRANSMISSION SYSTEM AND METHOD

REFERENCE TO RELATED APPLICATION

The present application is a continuation-in-part of co-pending application Ser. No. 08/436,167 entitled "TIRE MONITOR" filed May 8, 1995, now U.S. Pat. No. 5,656, 993, and assigned to the assignee of the present application. Reference is also made to co-pending application Ser. No. 08/417,514 filed Apr. 3, 1995 now abandoned, and assigned to the assignee of the present invention the contents of which are incorporated herein by reference.

FIELD OF THE INVENTION

The present invention relates to vehicular data collection and transmission systems and methods, and particularly to methods and apparatus for collecting data relating to vehicular operation, processing such data, and providing the processed data to the vehicular operator and the vehicular owner/maintenance facility.

REFERENCE TO APPENDIX

An appendix is attached hereto containing computer programs in hex code for the programs of the microprocessor of FIGS. 1 and 4 and the computer of FIG. 5.

THE PRIOR ART

The efficiency with which vehicles, particularly fleet vehicles, operate is of critical importance to the economic welfare of the owner. Well maintained vehicles are well known to provide anticipated life span and exhibit the type of reliability and efficiency that is desirable in the operation of large fleets. Since such vehicles frequently travel great distances and are required to operate under load conditions that demand peak performance, maintaining appropriate maintenance scheduling is of critical importance. Further, in the event of an emergency, particularly in instances where the emergency relates to the safety of the operator or other vehicles or individuals sharing the road with the vehicle, immediate presentation of information to avoid impending disaster is of critical importance. The utilization of information gathering for the detection of vehicular tires and their condition is known in the prior art; however, reference is made to previously mentioned patent application Ser. No. 08/436,167 discussing various prior art tire monitoring systems. These monitoring systems would ideally supply the necessary information for maintaining the respective vehicle tires; however, substantial additional information is required to permit intelligent scheduling not only of the individual tires but also of the vehicle upon which the tires are mounted. Such scheduling can be enhanced when significant additional information is gathered and presented in an appropriate logical manner to permit the operator/owner to make correct decisions concerning when the maintenance shall occur and how urgent the matter is.

OBJECTS OF THE INVENTION

It is therefore an object of the present invention to provide a vehicle data collection system and method to collect prescribed data, perform prescribed comparisons and calculations on the data and transmit the data to a remote location on the vehicle where further data manipulation occurs for presentation to the operator.

It is also an object of the invention to provide a vehicle data collection system and method for the collection and manipulation of data to enable the notification of the owner and operator of the vehicle when inefficient or unsafe conditions exist.

It is another object of the invention to monitor predetermined conditions existing on the vehicle during operation, to perform evaluations of the sensed conditions, and make logical decisions concerning the frequency and duration of such monitoring, while advising the operator of the specific efficiency and safety problems that are detected.

It is still another object of the present invention to sense and monitor selected operational and safety parameters during vehicle operation for presentation to the operator in the vehicle cab wherein the parameters are sensed from a wheel monitor mounted on the vehicle wheel within the tire on that wheel, and wherein the sensed data is digitized, manipulated, and used to modulate an RF signal for transmission to a location on the vehicle remote from the wheel.

These and other objects of the present invention will become apparent to those skilled in the art as the description thereof proceeds.

SUMMARY OF THE INVENTION

The present invention is directed to a vehicular data collection system that gathers information through the utilization of wheel modules mounted within the tires of a vehicle; these wheel modules collect data relating to the vehicle as well as the individual tires and transmits this information to a remote location within the vehicle for processing, presentation and possible retransmission.

The system of the present invention collects selected vehicle data in a prescribed sequence and manner, manipulates the data to determine data transmission scheduling, pre-processes the information including placing the data in digital format for RF transmission, transmits the data, receives the transmitted data on board the vehicle in a location remote from the transmitter, performs computational manipulation of the received data including comparison of data values to predetermined ranges of values and presenting the results of the data collection and computation on a visual display including visual/aural alarms to the vehicle operator; the data and the data computations are also available to external collection systems to provide status, performance, cost and maintenance information.

The primary data collection locations are located in wheel modules, each positioned on a different vehicle wheel within the vehicle tire on that wheel. Sensors are provided in each such module to detect selected data concerning conditions that exist in the environment of the respective module. The data is converted to digital format and utilized to modulate an RF signal to be broadcasted to a separate location on the vehicle. The data is received from all of the wheel modules and processed to provide information concerning the vehicle to the operator and make such information available to the owner/maintenance facility either in real time or on a stored basis for readout at a selected time and place.

The information collected is pre-processed; that is, it is digitized and reviewed to determine the respective rate of change of the detected data. The digitized data also forms the basis for logical decisions within the module to dictate further handling of the data before transmission including the determination of the frequency with which the data is sampled and the transmission intervals. The result of such pre-processing is the manipulation of the data to prioritize the data and effect prompt notification in the event that the rate of change indicates imminent failure or a rapidly deteriorating condition. Such prioritizing also increases the rate of data review for those quantities whose rate of change dictate a requirement for more frequent sampling to thus maintain a closer review of rapidly changing parameters.

BRIEF DESCRIPTION OF THE DRAWINGS

The present invention may more readily be understood by reference to the accompanying drawings in which:

FIG. 1 is a schematic drawing of a wheel module used in the system of the present invention.

FIG. 2 is an illustration of a semitrailer useful in describing the environment in which the system of the present invention operates.

FIG. 3 is a schematic diagram of the layout of the respective wheel module/wheels of a vehicle in relation to other portions of the system of the present invention.

DETAILED DESCRIPTION OF THE INVENTION

Figure 4:
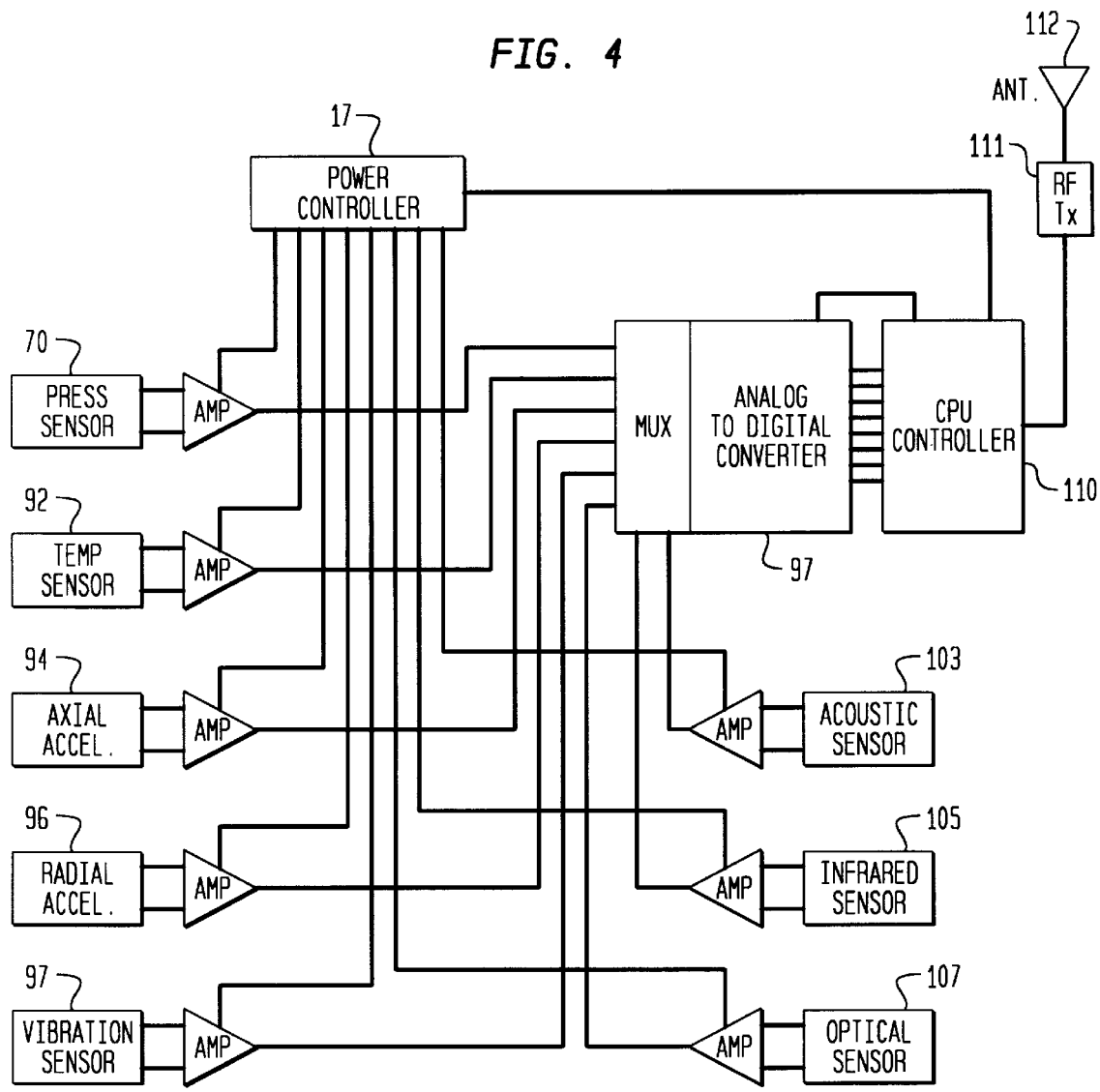
FIG. 4 is a schematic block diagram of a wheel module incorporated in the system of the present invention showing data gathering sensors in a manner similar to FIG. 1.

Referring now to FIG. 1, tire monitor 10 includes pressure sensing means 11, temperature sensing means 13, analogue to digital (A/D) converter 15, and microprocessor 19. The analogue data from pressure sensing means 11 and temperature sensing means 13 is converted into digital data by A/D converter 15 and microprocessor 19. The data is then transmitted serially through modulator 21 and antenna 23.

Microprocessor 19 can be any microprocessor having a low power or "sleep" mode in which the microprocessor draws very little battery current. In one embodiment of the invention, microprocessor 19 was a "COP 8" processor as sold by National Semiconductor. In particular, a "COP 8782" microprocessor was used. This particular version of the microprocessor includes one-time programmable memory and RAM (random access memory). As illustrated in FIG. 1, a small dot marks pin one and the pins are numbered consecutively, proceeding counter clockwise around the rectangle.

In accordance with one aspect of the invention, outputs G0, G1, and G2 (pins 17–19) are tied together and provide an on/off switch for the analogue portion of the circuitry. Pins 17–19 are connected to line 31 which enables voltage regulator 17. The output from regulator 17, on line 32, provides a reference input for pressure sensing means 11, temperature sensing means 13, and A/D converter 15. Thus, before microprocessor 19 enters the low power state, regulator 17 is disabled and the analogue portion of tire monitor 10 is also shut down, thereby conserving a substantial amount of battery power.

Pressure sensing means 11 includes resistor bridge 35 having one diagonal connected between line 32 and ground and the ends of the other diagonal connected to the non-inverting inputs of amplifiers 37 and 39. In one embodiment of the invention, resistor bridge 35 was a silicon, solid state resistor bridge in which a single semiconductor chip contains all four resistors. The differential output from the bridge is relatively small and is increased by amplifiers 37 and 39. The differential output of resistor bridges varies considerably from chip to chip and this variation is compensated by resistor 41. Resistor bridges are tested and sorted into groups and a particular value for resistor 41 is provided for each group. By matching resistor 41 to resistor bridge 35, a resolution of one bit per psia (pound per square inch absolute) is obtained.

Temperature sensing means 13 includes transistor 45 and amplifier 47. Transistor 45 is a silicon junction transistor wired as a diode between the non-inverting input of amplifier 47 and ground. The collector of transistor 45 is coupled to line 32 by resistor 49. Transistor 45 and resistor 49 act as a temperature sensitive potentiometer. The variations in voltage at the junction of transistor 45 and resistor 49 are increased in magnitude by amplifier 47 and coupled to A/D converter 15 by line 49. The resolution of temperature sensing means 13, in one embodiment of the invention, was about 1° C. per bit.

A/D converter 15 is controlled by output G3 (pin 20) of microprocessor 19, in a manner known per se in the art, to convert the voltages from pressure sensing means 11 and temperature sensing means 13 into digital data representative of pressure and temperature. The digital data is stored in memory within microprocessor 19 and is sent serially over output 51 to modulator 21. Modulator 21 converts the digital signals into an FM modulated signal having a center frequency of either 433 MHz or 418 MHz in the bands assigned by the FCC for general purpose telemetry. Other approved bands could be used instead. The output from modulator 21 is coupled by tuning coil 52 to antenna 23. Tire monitor 10, including antenna 23, is contained with a tire and attached to a wheel, preferably as described co-pending application Ser. No. 08/417,514, filed Apr. 3, 1995, and assigned to the assignee of this invention.

Three RC timer circuits are shown in FIG. 1. Input 53 to microprocessor 19 is a power-on reset, i.e. the microprocessor is reset when a battery is first connected to the tire monitor. Input 54 is the clock input to microprocessor 19. The clock frequency is controlled by the RC circuit and, in one embodiment of the invention, the clock frequency was two megahertz. Input 55 is the sleep timer input in which a low voltage on input 55 causes microprocessor 19 to enter the low power or sleep mode.

Transistor $Q_2$ is connected between input 55 and ground. The base of transistor $Q_2$ is coupled to output L4 (pin 11) of microprocessor 19. Jumper terminals 57 and 59 are also connected between input 55 and ground. Terminals 57 and 59 are used during the assembly for testing the tire monitor. After initial assembly and test, a temporary jumper 60 is inserted into terminals 57 and 59, grounding input 55 and forcing microprocessor 19 into a low power or sleep mode even after a battery is attached to the monitor.

Contacts 61, 62, and 63 provide access to pins 1, 2, and 3 of microprocessor 19. Contacts 61, 62, and 63 are used during final assembly of tire monitor 10 for operating the monitor under the control of an external test device. Input line 71 is connected to input L6 (pin 13 of microprocessor 19). A logic "high" voltage (greater than 3.5 volts) on line 71 causes the microprocessor to perform a data conversion and transmission once every five seconds. This mode of operation is used during the testing of the monitor and could be used as an emergency mode of transmission. This mode is not normally used because the continuous transmissions consume a great deal of battery power.

Microprocessor 19 can operate in several different modes of operation. A first mode of operation, with a jumper 60 connected between contacts 57 and 59, is described above. This mode is used to increase the "shelf life" of the battery (not shown) powering tire monitor 10. The jumper interconnecting contact 57 and 59 is removed or opened when tire monitor 10 is mounted on a wheel.

A second mode of operation occurs after the jumper is removed. Capacitor 73 charges, eventually reaching a logic "high" voltage. Microprocessor 19 awakens and produces an output signal on line 31, enabling voltage regulator 17 and, thereby, enabling pressure sensing means 11, temperature sensing means 13, and A/D converter 15. Temperature and pressure are measured. If the sensed pressure is below a predetermined amount, e.g. 20 psia, then pin 11 is raised, turning on transistor $Q_2$ and returning microprocessor 19 to the low power mode.

The second mode is referred to herein as the "semi-sleep" mode and conserves battery power by preventing microprocessor 19 from transmitting data. Modulator 21 consumes far more power than the rest of the circuit and, by preventing data from being transmitted, battery power is conserved. This mode of operation permits one to attach a tire monitor 10 to a wheel, and mount a tire thereon that is not going into immediate service. If the pressure in the tire exceeds the predetermined pressure, a flag is stored in the memory of microprocessor 19 that prevents a subsequent low pressure from being ignored, That is, once the pressure in a tire exceeds the predetermined pressure, a subsequent low pressure is interpreted as a problem and the tire monitor reacts accordingly. Thus, a subsequent low pressure is not ignored.

Terminals 61, 62, and 63 are used for programming microprocessor 19, including storing a unique identification code that is transmitted along with temperature, pressure, and voltage data to a receiver. As illustrated in FIG. 1, output w from A/D converter 15 tells microprocessor 19 what the voltage is on reference line 32. Outputs x and y tell microprocessor 19 the pressure being sensed by resistor bridge 35, and output z tells microprocessor 19 the temperature sensed by transistor Q1. The data transmitted by microprocessor 19 thus includes an identification code and data representing voltage, pressure, and temperature.

In a third mode of operation, monitor 10 transmits data periodically and the period depends upon the content of the data, particularly the rate of change between successive readings. In one embodiment of the invention, the period for transmission was determined in accordance with the following table. Other values of conversion rate, transmission frequency and repetition times could be used, depending upon the particular application.

TABLE I

| Change | Convert | Transmit | Repeat |
| --- | --- | --- | --- |
| ≦3 ⅛% | every 600 sec | every 900 sec | 3 times |
| >3 ⅛% | every 600 sec | every 810 sec | 6 times |
| >6 ¼% | every 270 sec | every 270 sec | 12 times |
| >12 ½% | every 90 sec | every 90 sec | 25 times |

TABLE I-continued

| Change | Convert | Transmit | Repeat |
| --- | --- | --- | --- |
| >25% | every 30 sec | every 30 sec | 50 times |
| >50% | every 10 sec | every 10 sec | 100 times |

The number of times that the data is transmitted in a given burst of data depends on the content of the data, particularly the rate of change of data. This assures that, among randomly transmitting tire monitors, the tire monitor sensing the greatest problem is most likely to be detected and the least likely to be affected by transmission errors. For example, a receiver may require three consecutive transmissions of the same data in order to recognize the data as valid. Transmitting critical data twenty-five times in succession assures that three consecutive transmissions will likely be received and interpreted as containing the same data. Thus, the reliability and effectiveness of the transmission are improved in accordance with this aspect on the invention.

The reliability and effectiveness of the transmission are further assured by locating the receiving antenna under the chassis of the tractor, as illustrated in FIG. 2. In accordance with the invention, it is preferred that receiving antenna 81 extend downwardly from chassis 83 of tractor 85. This locates receiving antenna 81 approximately in the same plane as the tire monitors in the tires of a tractor trailer. As illustrated in FIG. 2, receiving antenna 81 is located toward the rear portion of chassis 83, thereby locating antenna 81 near the wheels of the trailer.

FIG. 3 schematically illustrates the location of receiving antenna 81 among the tires of a tractor trailer. Antenna 81 is coupled to receiver 87 which demodulates the FM signal from the tire monitors, producing digital data which is stored in computer 89 for further processing or for display.

The invention thus provides a tire monitor having a life equal to or greater than the life of a tire. The monitor uniquely identifies each tire and adapts to the condition of the tire by more closely monitoring the tire if the condition of the tire changes rapidly. Coupling between the monitor and a receiver are improved by changing the period between transmissions and by changing the number of times that the data is repeated within a transmission, both in accordance with the content of the data. Coupling is further improved by locating the receiving antenna in approximately the same plane as the transmitting antennas.

Referring now to FIG. 4, a schematic block diagram of a wheel module portion of the system of the present invention is shown. The wheel module shown in functional block form in FIG. 4 follows the same structure and operation as the module shown in FIG. 1; however, FIG. 4 incorporates additional information gathering sensors in a manner to be described more fully hereinafter. Referring now to FIG. 4, pressure sensor 90 corresponds to the pressure sensor 11 of FIG. 1; similarly, temperature sensor 92 corresponds to the temperature sensing means 13 in FIG. 1. An axial accelerometer sensing device 94 as well as a radial accelerometer sensing device 96 are mounted in the wheel module; the analog signals derived from these accelerometers are amplified and subsequently digitized in the analog to digital converter 97. A vibration sensor 98 is also provided on the wheel monitor to sense accelerations all directions and, as will be described more fully hereinafter, may be used to supplement the radial and axial accelerometers or may be used instead of the latter in those instances where the precision and information derivable from axial and radial acceleration is not required. An acoustic sensor 103, infrared sensor 105, and an optical sensor 107 are provided to sense the corresponding analog data; the analog signals are amplified in a corresponding analog amplifier and these amplified analog signals are subsequently digitized in an analog to digital converter 97. The digital data is supplied to a microprocessor or central processing unit and controller 110 which performs certain preprocessing and data manipulation as will be discussed hereinafter. The data thus collected is utilized to modulate an RF carrier which is subsequently transmitted by transmitter 111 from antenna 112.

The data thus collected by sensors within the wheel module is collected in analog form, is manipulated and preprocessed, and is subsequently transmitted for reception elsewhere on the vehicle or, in some specific instances, to be received at a remote location such as a maintenance facility or marshaling yard. The information thus transmitted is received on board the vehicle at a location remote from the transmitting modules.

Figure 5:
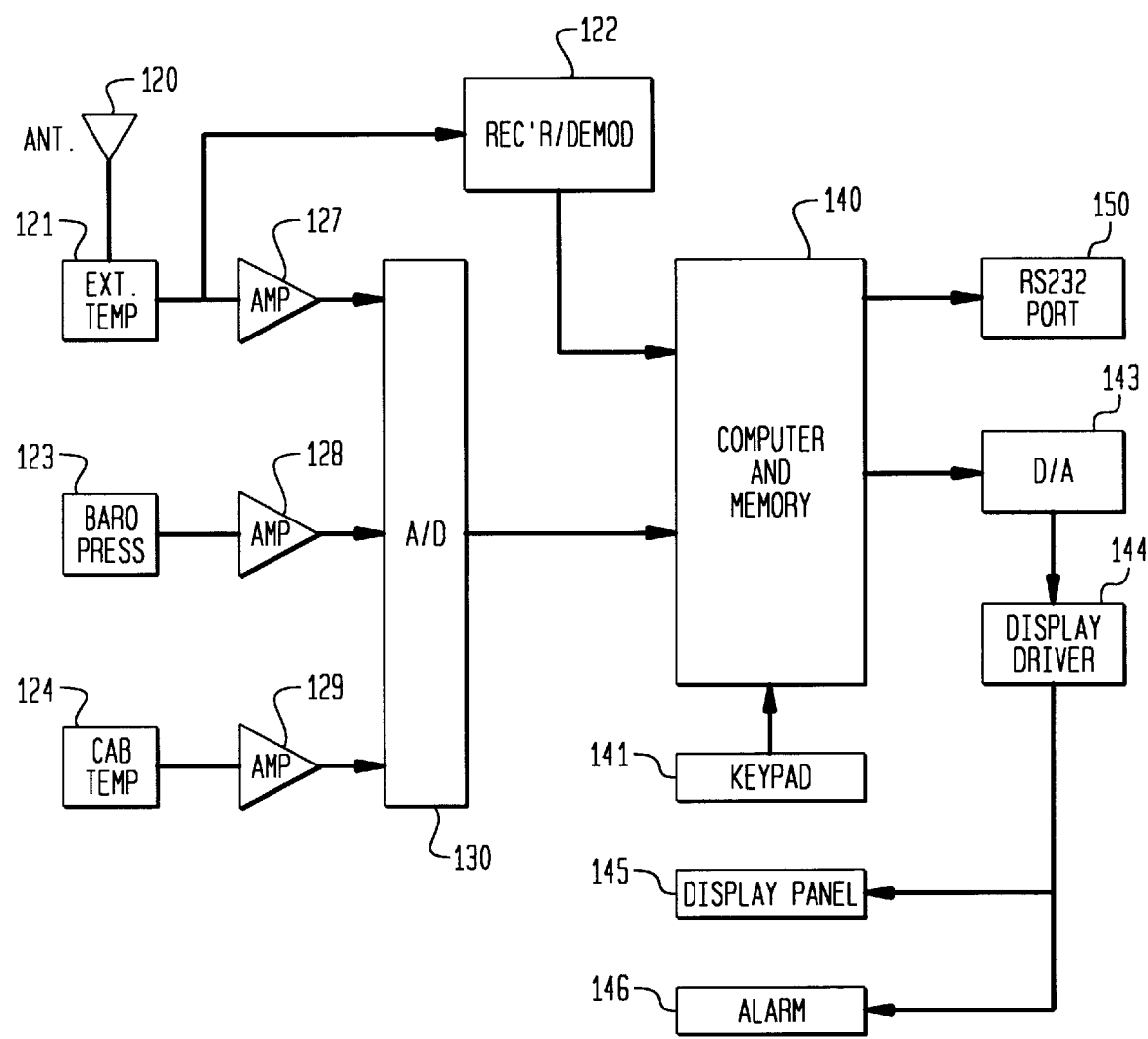
FIG. 5 is a schematic block diagram of the on board receiving section of the system of the present invention.

Referring now to FIG. 5, The signals transmitted from the antenna 112 in FIG. 4, are received from the remotely positioned antenna 120 placed elsewhere on the vehicle. The signals are applied to a receiver/demodulator 122 to thereby derive the digital words incorporated in the transmissions. A thermistor is positioned at the antenna 120 for sensing the outside temperature at the antenna 120 for purposes to be described later. The analog signal derived therefrom is applied through amplifier 127 to the analog to digital converter 130. A barometric pressure sensor 123 located in the vehicle cab at the computer unit and a cab temperature sensor 124 also positioned at the computer unit provide respective analog signals to amplifiers 128 and 129 which in turn applies the amplified signals to the analog to digital converter 130. The digitized signals of the antenna temperature, barometric pressure and cab temperature are provided to a central processing unit and memory 140. The central processing unit also receives input from a keypad 141 and provides a means for manipulating the received data in a manner to be described.

Data from the central processing unit 140 is converted back to analog form in a digital to analog converter 143 for application to a display driver 144 which in turn drives a display panel 145 and also energizes an alarm 146.

Figure 6:
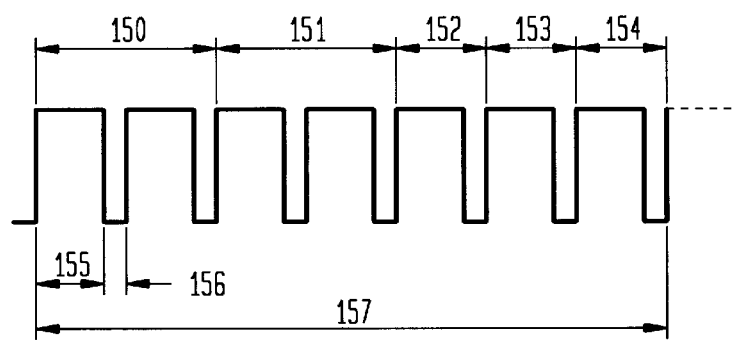
FIG. 6 is a schematic representation of a portion of a digital data word used in the system of the present invention.

Referring to FIG. 6, a typical data word is shown that is created in the wheel module, transmitted therefrom to the central processing unit located remotely on the vehicle and subsequently utilized in the calculations for presentation to the vehicle operator. In the embodiment chosen for illustration, the data word is organized into seven or more bytes. The first two bytes 150 being utilized for encoding the date of the word transmission. The next two bytes 151 are coded identification numbers to provide information concerning the specific wheel module. This information could include such data as manufacturing serial number, component identification and the like. The succeeding bytes are then presented in a predetermined order, each corresponding to a sensed quantity. For example, byte 152 is the encoded sensed wheel temperature, while byte 153 is tire pressure, byte 154 is wheel module battery voltage, etc. Each individual byte represents a 10 millisecond data stream as represented by the arrow 155 while the individual bytes are separated by a three millisecond pause indicated in FIG. 6 by the arrow 156. In the seven byte data word of FIG. 6, the entire word occupies approximately 88 milliseconds indicated by the arrow 157. The chosen data word may include several more bytes, each representing the encoded data from a variety of sensors; thus, the timing for such increased length data word would of course be longer.

Figure 7:
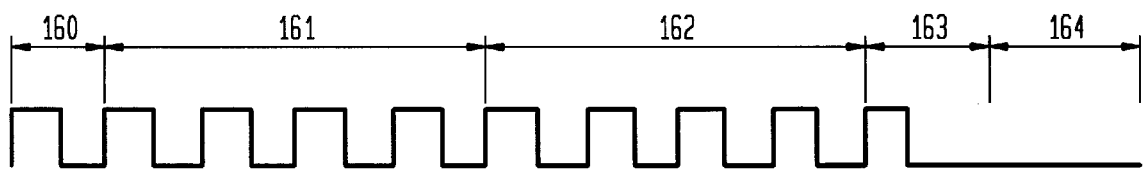
FIG. 7 is a schematic representation of the digital bit stream incorporated within the individual bytes of the data word.

Each of the information bytes of FIG. 6 comprises an encoded bit stream as shown in FIG. 7. Referring to FIG. 7, the data byte incorporates a start bit 160 followed by encoded characters 161 and 162. A parity bit 163 is provided and two stop bits 164 are used as an indication of the end of the bit stream for that particular byte. The characters 161 and 162 may thus be utilized for encoding the digital representations of sensed quantities such as temperature pressure, vibration and the like.

Figure 8:
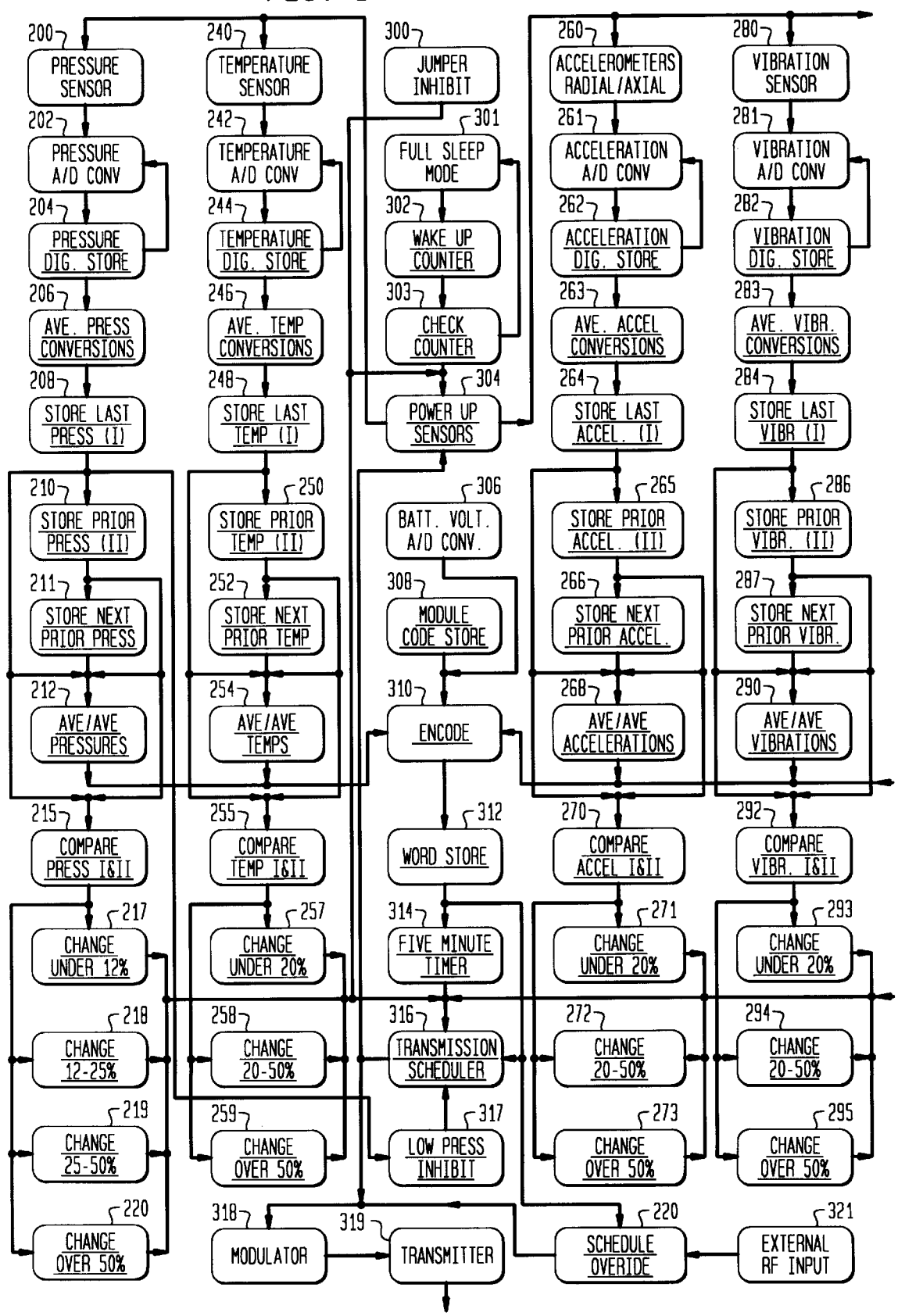
FIGS. 8 and 9 are functional flow charts useful for describing the operation of the wheel module portion of the system of the present invention.
Figure 9:
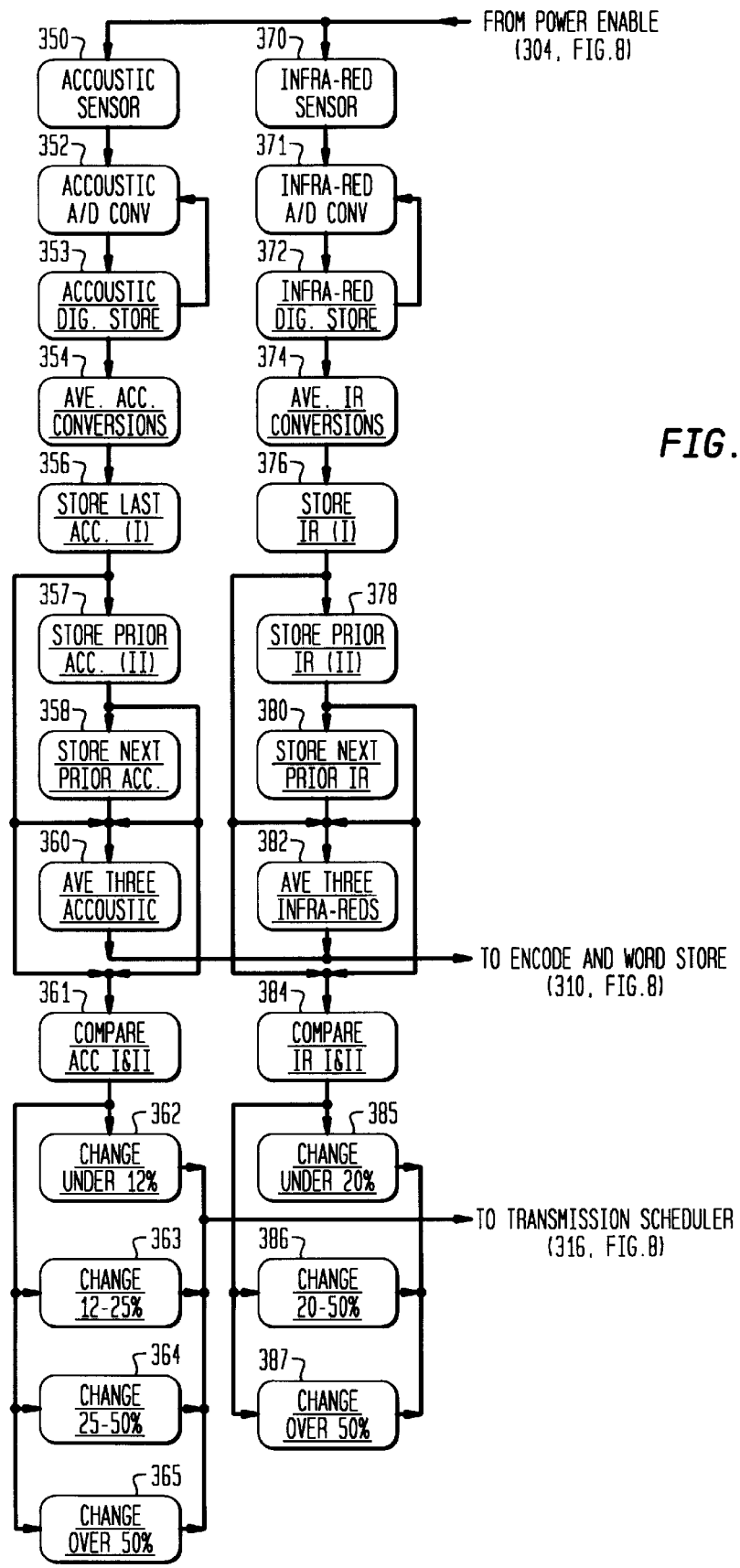
Figure 10:
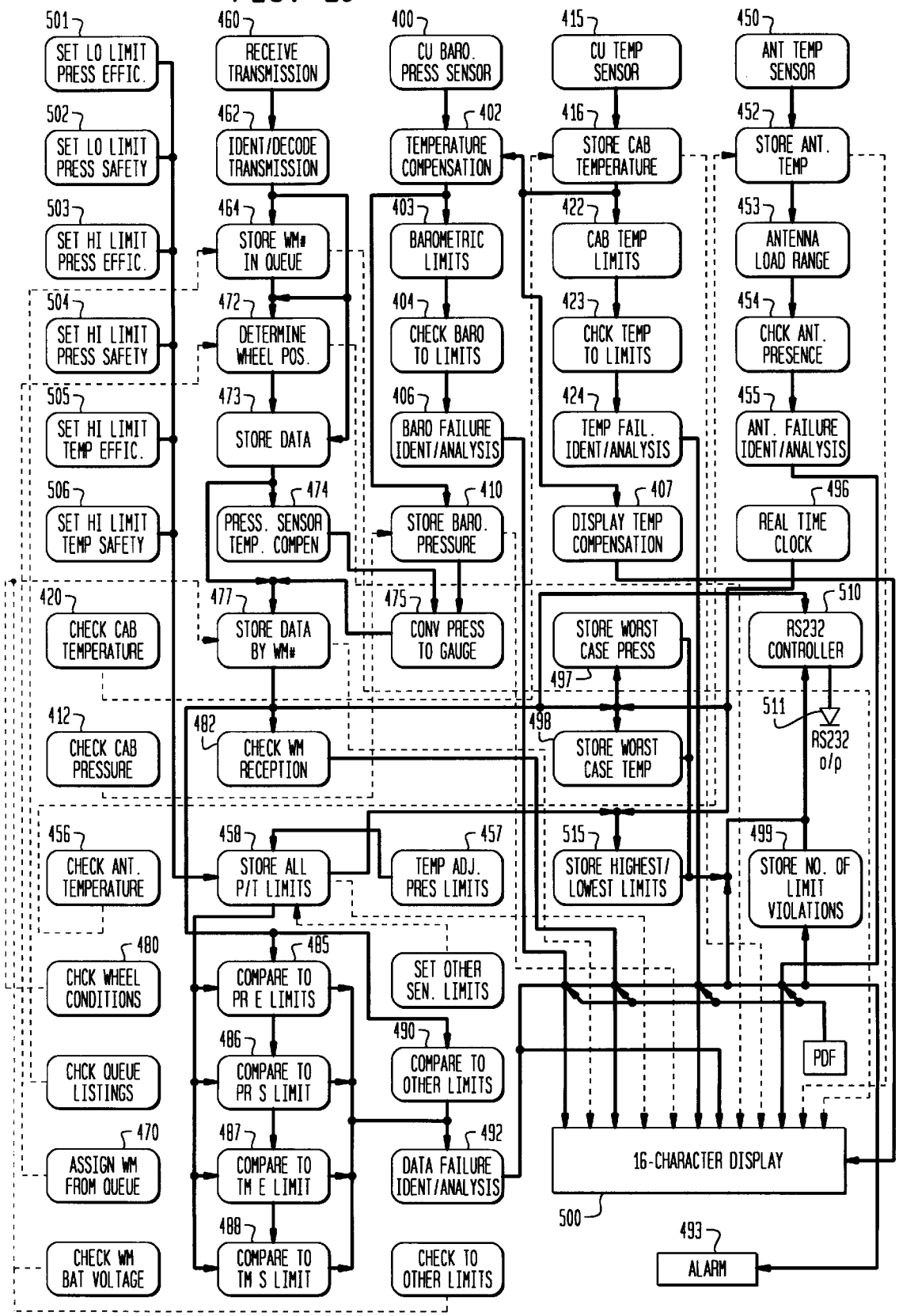
FIG. 10 is a schematic flow diagram useful for describing the on board receiving and computing portion of the system of the present invention.

The method and operation of the system of the present invention can be described with the aid of the functional flow diagrams of FIGS. 8, 9 and 10.

Referring now to FIG. 8, the pressure sensing means or pressure sensor 200 is formed using readily available solid state components; the particular sensor chosen in the preferred embodiment is a Lucas Nova MPC103C01639. The pressure sensor is positioned in the wheel module and contains a solid state pressure sensor with a maximum pressure range of 100 psi absolute. The output from the pressure sensor is an analog voltage proportional to the absolute pressure of the environment in which the module is situated. The analog voltage is applied to the pressure A/D converter 202 where the analog voltage is converted into a digital signal which is stored in pressure digital store 204 in the memory provided in a microprocessor. As described in connection with FIG. 1, the particular microprocessor is available from National Semiconductor and is identified as a "COP8782"; the microprocessor includes a memory for accepting and storing the results of the digital conversion. Additional successive pressure readings are obtained from the pressure sensor 200, converted into digital format and supplied to the microprocessor. In the chosen embodiment, three successive pressure readings are converted to digital format and delivered to the microprocessor and averaged.

The average digital value of the sensed pressure is then stored 206. The sampling is subsequently again triggered by the microprocessor and three samples are again acquired, averaged and stored. The storage of these averages is provided in three registers Store Last Pressure 208, Store Prior Pressure 210, and Store Next Prior Pressure 211. The contents of these registers, each containing the average digital representation of three successive pressure samples, is then again averaged and placed in an Average of Averages Register 212.

At this time, the average of three successive digital representations of the sensed absolute pressure has been stored in a register while two other registers contain similar averages of three sets of samples taken at successive periods of time. In the present embodiment, the successive pressure conversions to digital form are sensed and averaged almost instantaneously while succeeding sampling and averaging is spaced at two minute intervals. Under program control, the microprocessor compares the most recent and the next most recent averages of the pressure contained in the storage registers 208 and 210. This comparison 215 of the averages determines the degree of change of the last sampling compared to the sampling occurring two minutes earlier; the microprocessor then evaluates the change and provides an instruction depending on whether the change in these successive average pressure values is under 12 percent 217, is between 12 and 25 percent 219, is between 25 and 50 percent 220, or is over 50 percent. Each of these percentage changes results in a different instruction concerning how to process the data over the succeeding second and minutes that essentially determines whether the pressure change represents a slow leak, a moderate leak, a fast leak or an impending explosive decompression; the nature of the air loss sensed by the pressure sensor will determine the appropriate response in terms of future sensing of the pressure as well as the nature of the presentation of the information to the operator. For example, if the rate of change indicates an explosive decompression, a continuous reading of the pressure will be required; however, this continuous reading need last no longer than one minute because after an explosive decompression the tire will have been destroyed. On the other hand, if the comparison of the recent and next most recent pressure averages indicates a very low rate of change, and thus indicates a very slow leak, continuous sampling and transmission of such information is not needed although more frequent sampling is required than the two minute intervals. Further, because the rate of change indicates a slow leak, the period of sampling should extend for a significant period of time. Therefore, determining the rate of change of pressure readings by comparing successive pressure averages provides an indication to the computer to remain in a mode of repetitive transmissions of data over a period of time that is appropriate for the nature of the leak.

The number of times that data is transmitted depending on the content of the data is illustrated in Table I. In that table, the rates of change are shown grouped from 3⅛ percentage or less through 50 percent or more. The range of changes that will trigger different handling and instructions for the manipulation of the data will depend on the specific application in which the system is applied. The wheel module described in connection with FIG. 1 to which Table I is applicable, incorporates a sensitivity to a rate of change as little as 3⅛ percent; however, depending on the application of the system, the ranges of change will vary. Therefore, the rates of change in the functional flow diagram of FIG. 8 applicable to pressure changes for example are sensitive to changes beginning with 12 percent.

The temperature sensor 240, as described above in connection with FIG. 1, provides a voltage proportional to the temperature existing at the sensor.

Physically, the temperature sensor is part of the wheel module that sits directly on the wheel within the tire. Since the sensor is in intimate contact with the wheel, the temperature drop from the wheel to the sensor is negligible although there is a very slight thermal lag. The temperature sensor therefore senses a temperature representative of the wheel temperature and is affected by sources of the heat other than the tire. For example, if the wheel is being heated through a brake system or a bearing failure, the heat resulting by such activity will be transferred to the wheel module. Although the heat will also be transferred to the tire, and the tire lifetime will therefore be adversely affected, the temperature that is being sensed is nevertheless not tire temperature. However, if there is a problem with the tire, for example if the tire is overloaded and is therefore being forced to over flex, thus generating hot spots in the tire, the heat generated thereby will create an increase in temperature of the wheel module temperature sensor. However, since the thermal conductivity of the rubber in the tire is very poor, the hot spot is not likely to create a major change in the wheel temperature sensed by the temperature sensor. An Infrared sensor, to be described later, is provided to directly sense the infrared emissions from the tire and thus derive a tire temperature indication. Therefore, temperature sensed by the temperature sensor is not necessarily the temperature of the tire; that is, the sensed temperature is affected by the heat generated by the tire itself, as well as heat generated by wheel bearings, the axle, the brakes, and any component in thermal communication with the temperature sensor. The sensed temperature in the form of a voltage proportional to the temperature is applied to the temperature analog to digital converter 242 and converted to digital format. In a manner similar to the technique for sampling pressure, the successive digital representations of temperature are sampled one after the other to generate three different digital conversions of the temperature which are stored in temperature digital store 244 and averaged 246; the conversion and averaging is repeated three times and is stored in successive registers Store Last Temperature 248, Store Prior Temperature 250, and Store Next Prior Temperature 252. The average of these three averages is then obtained and stored in the Average of Averages Temperature Register 254.

A comparison 255 of the contents of the store last temperature register 248 and store prior temperature register 250 is made to ascertain the rate of change of the temperature. If the change is less than 20 percent 257, the normal mode of operation takes preference and every five minutes the module will transmit the latest stored average of averages contained in the average of averages temperature register 254. The microprocessor provides a different instruction to the module depending on whether the change in the most recent, as compared to the next most recent average sensed temperature is under 20 percent 257, between 20 to 50 percent 258, and or is over 50 percent 256. Depending on the circumstances at the time of the temperature change, these particular temperature ranges may represent normal increases in temperature within the wheel; for example, a substantial temperature increase will occur when the vehicle moves from a parking situation into a highway travel mode. A change in temperature of 20 percent to 50 percent may represent the brake being applied as the vehicle is coming to a stop. A change of over 50 percent may represent that the brake is overheating, or the bearings may have lost their lubrication, and the bearings are overheating; therefore, an indication of a change of over 50 percent, while on the highway, represents a catastrophic change dictating that the module should go into a continuous sampling and transmission mode.

Acceleration sensors are positioned on the module to sense radial and axial acceleration. In the functional block diagram of FIG. 8, the radial and axial accelerometers are grouped into a single functional entity 260; however, it will be understood that accelerations in such mutually orthogonal directions provide separate sensed quantities each having its own specific criteria for investigation and handling. The sensed values are totally independent of each other but are grouped on the functional flow diagram for convenience. The accelerations in the directions in which the sensors are oriented and are sensitive result in a voltage output that is proportional to the acceleration forces that it senses.

The axial accelerometer is oriented with its sensitive axis parallel to the axle to detect accelerations imparted to the accelerometer along that direction. If the wheel on which the module is mounted is correctly aligned and balanced, no wobbling or axial acceleration would occur and the resulting output from the axial accelerometer would be zero. In the event the wheel is misaligned or is out of true or is imbalanced, there will be an acceleration in the axial direction that will be detected by the axial accelerometer. If the wheel is misaligned, there will be a steady component of acceleration in the axial direction; if the wheel is wobbling or is out of balance, then there will be a variation in the axial acceleration having a relatively short period. The detection of axial acceleration of the above nature is not particularly critical unless the changing nature of the condition indicates a worsening of the misalignment or wobble. In the case of a wobbling wheel, or an imbalanced wheel, a rapidly worsening situation suggests that the wheel is loose and could cause a severe mechanical problem and driving difficulties including the loss of the wheel.

The analog voltage output of the axial accelerometer is converted to digital format 261 and stored in the axial acceleration digital store register 262. The sampling is repeated three times and the successive digital representations of the axial acceleration are averaged 263. The average is stored as are the succeeding averages of three successive digital conversions of axial accelerometer readings. The averages are stored in Store Last Accelerometer Register 264, Store Prior Accelerometer Register 265, and Store Next Prior Accelerometer Register 266. The three averages stored in these registers are averaged and the average of the averages is stored in the average of averages accelerations register 268.

The contents of the Store Last Accelerometer Register 264 and the Store Prior Accelerometer Register 265 and compared 270 to determine the change of the accelerometer value during the period between the last and next to last sampling of the axial acceleration. Under program control, the microprocessor determines whether the change is under 20 percent 271, between 20 percent and 50 percent 272, or over 50 percent 273. The important consideration is again the worsening situation indicated by a high rate of change of the axial acceleration. A slightly misaligned or slightly imbalanced wheel that presents a steady axial acceleration indicates that no immediate action is necessary but that the wheel should be serviced at the next convenient service interval. If the axial acceleration changes, and particularly if the rate of change is high, the situation is rapidly getting worse perhaps requiring that the operator immediately stop the vehicle before a failure occurs creating serious damage.

The radial accelerometer is mounted on the module and is positioned perpendicular to the axial accelerometer and radially of the wheel. The sensed radial acceleration is an indication of the rotational velocity of the wheel which, with a given tire size, should be a direct indication of the linear velocity of the vehicle. In a manner similar to axial accelerometer signals, the radial accelerometers provide an analog voltage output that is converted in the acceleration analog to digital converter 261; three successive digital conversions are obtained and averaged and the average of these successive radial acceleration signals are stored 263. Succeeding averages are stored in Store Last Radial Accelerometer Register 264, Store Prior Radial Accelerometer Register 265, and Store Next Prior Radial Accelerometer Register 266. The three stored averages are then averaged and stored in the average of average radial accelerometer register 268.

The radial accelerations represented by the digital quantity stored in the Store Last Radial Accelerometer Register and Store Prior Radial Accelerometer Register are compared 270 and under program control the processor determines the change between these two stored accelerometer reading averages. The percentage change may provide the information necessary to change the sampling frequency as well as transmission scheduling. For example, if the indication of velocity does not match the speed of the vehicle, it is possible that a different or perhaps wrong size tire has been mounted on the wheel; similarly, the wheel may be slightly misaligned so that the wheel is not turning at the vehicle speed, thus indicating that the tire is skidding. If the tire were under-inflated or perhaps overloaded, the effective rolling diameter of the wheel would be different than the nominal value thus resulting in an indication of speed different from the actual vehicle velocity. Perhaps the most significant contribution of the radial accelerometer is the ability to maintain a record of distance traveled by the tire or tire mileage. Thus, the radial sensor can present an estimate of how far the tire has gone since it was put on the wheel by a measured sampling of the speed of the vehicle. In other words, under normal conditions the system would take a set of samplings, average those samplings every five minutes and transmit the information. The presentation of the average speed every five minutes over a period of months or weeks is a reasonably accurate measurement of how far the tire has gone since it was mounted on the wheel.

A vibration sensor 280 may be mounted on the module. The previously discussed radial and axially accelerometers are devices for detecting acceleration in a specific direction and are mounted in a particular manner in those specific directions. Vibration sensors are omni-directional; that is, they provide an output voltage signal corresponding to an imparted acceleration irrespective of the direction or axis along which the acceleration occurs. That is, the vibration sensor provides an analog voltage output that senses a rate of change of movement in any direction imparted to the sensor. Vibration sensors tend to be very simple electric devices that are small and depend on a weight to move in any direction resulting in the change in impedance of a piezoelectric device; the change in analog voltage may then be digitized in a manner similar to that of the accelerometer signals. The vibration sensor and vibration sensing technique is a less expensive acceleration detecting technique that is useful in a variety of applications particularly in vehicles that may not require the sophistication of the interpretation of directional accelerations such as motor homes, RV's and the like. The implementation of vibration sensing and the utilization of the information derived from the vibration sensor corresponds to the handling of the data resulting from the detection of directional acceleration as in the radial and axial accelerometers. The analog information is digitized 281 and stored 282 and then averaged 283 with two succeeding digitized samples. The average vibration value is stored in a register 285 as are the next two succeeding averages 286, 287 of three digitized vibration samples. The averages stored in the three registers are averaged and stored in an average of averages vibration register 290. Again, as in the case with the manipulation of the acceleration data, the stored vibration digital signals are compared 292 by comparing the content of the register containing the last vibration sample and the next to last vibration sample; the percentage change in these sample averages 293, 294, 295 results in an indication of the future handling of the rate of sampling as well as the intervals between transmissions or scheduling.

The contents of the respective registers containing the average of averages 212, 254, 268 and 292 are accessed and utilized to transmit the corresponding information at prescribed intervals. The control of the frequency with which the sensed quantity is sensed, or conversion interval, and the transmission scheduling of the data occurs within the wheel module. As described above, a jumper maintains the system in a full sleep mode 301 to prevent the system from fully functioning although there is still a small background drain caused by timers and counters. When the jumper is removed, the system then moves into its normal operation mode and is no longer inhibited from assuming its functional duties. As described above in connection with FIG. 1, removal of the jumper removes the jumper inhibit 300 signal that prevents the powering of the sensors. With the jumper in place, the system is in a "full sleep mode" that preserves battery power. During the full sleep mode a counter 302 is operating that counts up to 120 one second counts at which time the counter is reset and it begins counting again. When the jumper is removed, the jumper inhibit is removed and when the wake-up counter reaches 120 (2 minutes) it powers up 304 the sensors and the rest of the circuit in order to take a sampling of the data detected by the sensors. At the same time, the counter is reset 303 and the procedure is repeated. Thus, under normal sampling procedures, the sensors are activated every two minutes.

The battery voltage is converted to digital format 306 for encoding and transmission. In the preferred embodiment, the primary battery supply is a lithium battery, the output voltage of which may be regulated. The module code store 308 is a memory slot into which an unique code number is stored during the testing and calibration of the module. The information stored incorporates the manufacturing number, the identification of a panel of wheel modules, and the identification of the particular wheel model position represented by the specific module. That information in digital form is stored in the module code store 308; the stored code forms a word incorporating the module code as well as the stored digital information in the average of averages registers of the respective sensors. As previously mentioned, the battery voltage digital representation is also incorporated in the encoded word. The completed word is encoded 310 and is stored in the word store 312. A five minute timer 314, within the microprocessor, utilizes a standard clock that initiates a transmitting sequence that schedules a transmission 316 every five minutes to transmit the word stored in Word Store. Thus, every five minutes the timer triggers the transmission schedule to make the transmission of the encoded data. The five minute interval for successive transmissions is a default time period; however, a more frequent transmission period is implemented if an unusual event occurs such as a rapidly increasing temperature. Thus, the occurrence of an unusual event such as a large change in axial acceleration readings will cause the transmission of data more frequently as well as increase the sampling and conversion rate of the data from the sensor, and the number of times the transmission is repeated. For example, reference may be had to Table I as an example of the variations in the sampling, converting and transmitting data on a schedule other than the default values. The transmission scheduler 316 receives instructions concerning the transmission schedule based upon the instructions supplied by the five minute timer or instructions received from the microprocessor resulting from a detected sensor change exceeding a predetermined maximum percentage change; for example, a 25 percent change in the sensed pressure between two successive stored pressure averages.

The lower pressure inhibit 317 inhibits the transmission scheduler from scheduling a transmission. That is, the transmission scheduler 316 is shut down and is not allowed to transmit if the sensed pressure is below 20 psi absolute. As described above in connection with FIG. 1, when the tire is first mounted on the wheel, and not placed into service and inflated, the module will remain in its "semi-sleep" mode and will not transmit. The inhibiting of transmission under very low pressure also facilitates compliance with FCC regulations concerning the transmission from the module. That is, the RF signal transmitted by the wheel module is attenuated by the tire such that the signal escaping from the environment of the tire conforms to the FCC regulations for signal strength in the relevant frequency range. If the tire were destroyed or removed from the wheel, the signal strength might exceed the relevant regulations. Thus, low pressure inhibit prevents such occurrence. A modulator 318 modulates the carrier frequency with the encoded data and supplies the encoded data to a transmitter 319 for transmission via the antenna attached to the wheel module.

A schedule override 320 is provided to receive an external RF input 321 to enable the reception of a specifically coded externally generated RF input to cause the module to immediately transmit the data stored in Word Store 312. The schedule override incorporates a simple receiver and demodulator responsive to a specific frequency to tell the microprocessor to immediately enable the transmission scheduler to transmit information. The schedule override facilitates the implementation of an external command transmitted for example at a storage yard having numerous trailers and wherein instant information regarding the tires on the trailer are required. Such technique is also useful when a tire is being inflated so that instant pressure indication can be obtained as the tire is pumped up.

FIG. 9 is a continuation of the flow diagram of FIG. 8 and interconnects therewith as indicated. That is, the acoustic sensor and infrared sensor functions are powered from the power up sensor 304 of FIG. 8 while the average of averages registers for the acoustic and infrared signals is provided to the encode function 310 of FIG. 8. Similarly, the result of the comparison of successive averages for both the acoustic signals as well as the infrared signals are provided to the transmission scheduler 316 of FIG. 8.

An acoustic sensor 350 is powered up in a manner similar to other sensors and senses the sound or noise transmitted to the sensor through its mounting on the wheel; as used herein, "sound" is intended to include subsonic as well as ultrasonic frequencies. That is, the acoustic input is derived through the solid mounting of the wheel module on the wheel and thus actually receives its input not just from the noise generated by the tire in contact with a road, but all of the information that can be transmitted in acoustic format through the solid mounting of the sensor on the wheel such as wheel bearing noise, differential noise, etc. The acoustic sensor has particular applicability in the detection of the frequency spectrum of the noises generated by the multitude of sources transmitting through the solid mounting of the wheel module on the wheel. Thus, a changing spectrum of frequencies and amplitudes will be sensed; of particular interest, however, is the rate of change of the frequency and amplitudes existing in this spectrum. That is, in a particular application a characteristic spectrum change may be expected for normal operating conditions such as the change of the sensed frequencies and amplitudes resulting from wear (e.g., bearing wear). However, the rate of this change is a direct indication of the acceleration of such wear and may in some circumstances provide advanced warning of impending failure.

In some circumstances, an acoustic filter may be implemented in the acoustic sensor to concentrate the sensing on a particular frequency range that may be characteristic of specific elements of interest in a particular application. The thus derived acoustic signal is converted to digital format 352 and stored 353, and then averaged with two succeeding digitally converted acoustic signals 354. The average of the three signals is then stored 356 and as in the case of other sensors, the successive averages are averaged and stored 357, 358 and the three averages are averaged and stored in an average of averages acoustic register 360. Importantly, a comparison 361 is made of the last stored average and the next to last stored average to obtain a percentage change in the two successive averages. The percentage change in the successive averages is detected with the result dictating the future action to be taken concerning the frequency of sampling, as well as the frequency of transmission of the information. Thus, a determination is made whether the change is under 12 percent 362, between 12 and 25 percent 363, between 25 and 50 percent 364, or over 50 percent 365. This data is then provided to the transmission scheduler 316 of FIG. 8.

As mentioned previously in connection with the temperature sensor, the temperature was derived by the heat flow from the wheel upon which the wheel module was mounted. To obtain the temperature of the tire mounted on the wheel, an infrared sensor is provided on the wheel module attached to the wheel. The infrared sensor 370 is a readily available solid state device incorporating a lens for selecting a specific spot or location for sensing. The infrared sensor of the present system is focused upon a selected area of the tire and the IR radiation from that location is sensed to provide an output signal corresponding to the detected temperature of that area. The signal is converted to digital format 371 and stored 372. Three successive samples are obtained, each of which is digitized and all of which are averaged 374 with the average being stored in a register 376. In a manner similar to the manipulation of digital sensor readings of other sensors, another set of three sensor readings is obtained and digitized and averaged and placed in a register 378. Three such averages are placed in Store IR 376, Store Prior IR 378, and Store Next Prior IR 380 registers. The readings obtained from successive conversions from analog to digital formal occur at the default interval of two minutes. The three stored averages are averaged and stored in the average of averages IR register 382 to ultimately be transmitted at the default interval of five minutes. The stored average contained in the store IR register 376 and that contained in the store prior IR 378 register are compared to determine the change between the two. The comparison of the stored averages is made to determine whether or not the change is under 20 percent 385, between 20 and 50 percent 386, or over 50 percent 387. The percentage change is thus obtained and, if necessary, the two minute default sensing interval and the five minute default transmission interval are changed. That is, in a manner similar to that discussed above in connection with Table I, the conditions such as a rapidly increased tire temperature may dictate that the temperature be sensed continuously while the results of the averaging be scheduled for transmission on a much more frequent basis.

FIG. 10 is a flow diagram illustrating the operation of the remote computer and display portion of the system of the present invention. The computer and display together with a keyboard would normally be positioned on the vehicle remote from the wheel modules to receive transmissions from the latter and to perform calculations and manipulations on the data for display and storage. In the embodiment chosen for illustration, the computer and display are positioned in the cab of a tractor trailer. The portion of the system of the present invention positioned in the tractor trailer cab includes a computer unit connected to receive demodulated transmissions from the transmitters of the respective wheel modules as described in connection with FIG. 5. The processor also receives digitized representations of antenna temperature, the temperature at the cab mounted computer, as well as the barometric pressure existing at the computer. A keypad is provided as manual input to the system and a display is provided as well as an alarm in the form of a light and/or an aural alarm.

In FIG. 10, the keypad keys are shown in the left column of functional blocks. Signals, commands or data from keypad keys are shown in broken lines; solid lines indicate that such information is under computer and computer program control. As described above in connection with the respective wheel modules, the pressure sensed at the wheel module within the individual tire is an absolute reading. Since tire pressures are usually cited and adjusted in gauge pressure, it is necessary to adjust the absolute pressure signal received from the individual modules for the barometric pressure occurring outside of the respective tires. Accordingly, a barometric pressure sensor 400 is mounted within the cab and may be mounted within the computer in the cab. The barometric pressure sensor may be similar to the pressure sensors used in the individual wheel modules. The analog pressure signal is digitized and the digital representation of the barometric pressure is then fed to a temperature compensation circuit 402 which receives a temperature input from another sensor (to be described) which is used to compensate the sensed pressure. The pressure sensors are not accurate over a very wide temperature range and it is therefore necessary to compensate for the temperature variations at the location of sensing the barometric pressure.

The resulting accurate barometric pressure is then checked 404 within predetermined stored limits 403 to be sure that the resulting barometric pressure is reasonable; for example, if for some reason the barometric pressure that is sensed indicates a malfunction in the sensor, it is important not to use the erroneous barometric pressure to modify the wheel module absolute pressure sensing quantities in a manner that could present an erroneous gauge pressure for the individual tires. To avoid such difficulties, the sensed barometric pressure that is temperature compensated is checked to ensure that the resulting compensated barometric pressure is within reasonably expected limits. If this compensated barometric pressure appears to be outside of the reasonable barometric pressure limits, the information of the failure 406 of the barometric pressure sensor is supplied to the display 500 to represent to the operator that the barometric sensor has failed and the pressure sensing aspects of the computer will not proceed. The temperature compensated barometric pressure is also stored 410 and is available for display upon actuation of the Check Cab Pressure key 412 on the keypad.

The cab mounted computer is also provided with a temperature sensor 415 that is similar to the sensor contained in the individual wheel modules. The temperature sensor provides cab temperature information which is digitized and stored 416 to be made available upon actuation of a key Check Cab Temperature 420 for display to the operator. The stored cab temperature is also applied to the temperature compensation circuit 402 to compensate the sensed barometric pressure indication as described above. The stored cab temperature is also compared with predetermined cab temperature limits 422, 423 to determine that the indicated cab temperature is within reasonably expected limits. Comparing the sensed cab temperature to reasonable limits over which the system will operate is important in view of the fact that this temperature is used to compensate the barometric pressure. The cab temperature, or the computer temperature, is important with respect to the operating range of the system; that is, if the cab is either too hot or too cold, the operating range of the electronics might be exceeded. If the detected cab temperature is outside of the acceptable range 424 for proper operation of the electronics, an indication is provided to the operator at the display 500 indicating that either the cab temperature sensor has failed or the temperature is outside of the acceptable temperature range and that therefore the system cannot provide proper and accurate indications of wheel module, wheel, or tire conditions. The stored cab temperature is also provided to a display temperature compensation circuit 407. The display 500 is not easily read over a wide temperature range; that is, under high temperature and very low temperature conditions the LED display looses its visibility and the characters disappear. By changing the analog voltage on the display the range at which the display is readable is increased. Therefore, the digital representation of the stored cab temperature is applied to the display temperature compensation circuit 407 which generates an appropriate analog amplitude to modify the voltage to the display and maintain its visibility over a wide range of cab temperatures.

The antenna receiving transmissions from the respective wheel modules is provided with a temperature sensor 450. Specifically, the receiving antenna includes a thermistor as described in connection with FIG. 5 and is positioned in the base of the antenna to provide a varying resistance proportional to temperature change. The cable from the antenna to the cab therefore not only provides an RF cable feed to the receiver but also provides a connection to the thermistor to enable the determination of the resistance and hence the outside temperature. The sensed antenna or outside temperature is digitized and stored 452; the stored temperature is compared to a predetermined antenna temperature range 453 to ensure that the temperature is within reasonable temperature limits; that is, if the detected temperature is outside the range of reasonableness, then there is a likelihood of antenna damage and the sensed temperature is analyzed to determined the cause of the unreasonable reading. The antenna is checked for presence 454; that is, if for example the antenna has been accidentally struck by an object such as a rock and has been dislodged or knocked off, an open circuit on the sense line would suggest that the thermistor circuit is open and the thermistor dislodged. The result of the failure analysis 455 is applied to the display 500 to inform the operator that the antenna is missing or that there is an antenna problem. The stored antenna temperature may be displayed through the operation of the Check Antenna Temperature key 456 on the keyboard to provide an indication of outside temperature.

The RF signals transmitted from the individual wheel modules are received, demodulated, and returned to original data word form as described in connection with FIGS. 5, 6 and 7. The received transmission, in the form of the data word received at 460 is then decoded 462 to specifically extract from that decoded information the initial portion of the word which is the wheel module identification number. Unless that front end of the word is an identifiable wheel module code, the transmission is ignored. If the received decoded word is identifiable, it is then stored in a wheel module queue 464.

When the wheel modules are removed from their shipping box and mounted on the wheel that the tire is put on, the jumper is removed to take the module out of the deep sleep mode and permit the sensors to be powered up. When the tire is mounted on the wheel and is pressurized, the wheel module is now permitted to transmit the information that it has been sensing. When the wheel is mounted on the vehicle and is therefore near enough for the receive antenna of the vehicle to receive the transmitted information, the information will be picked up and the wheel module number will be stored in the wheel module number queue. When the installation is complete, the installer will then proceed to the computer unit and access the word module number queue and from the information that he has on a card as to where each wheel module is on the vehicle he will then systematically assign a wheel position through the keyboard as the wheel module number in queue is removed from the queue and sent to data storage. He will ultimately have assigned all of the installed wheel modules and under normal circumstances will then have emptied the queue.

When the wheel module wheel and tire are first installed on the vehicle, an installation procedure is required to enable the system to identify a particular wheel module as being located at a particular location on the vehicle. When the wheel module and tire are initially inflated such that the module is activated and can transmit, the received transmissions are demodulated and decoded and are placed in the word module queue 464. The operator who is in charge of the installation of the tire, wheel and wheel module on the vehicle can then through application of the keypad key assign a wheel module from queue 470 to a position on the vehicle. The keypad key 470 is the operator input through the keypad which entails a keying sequence that enables the operator to assign the selected wheel and wheel module number in the queue to a specific position on the vehicle. For example, the keying sequence could include actuation of the keypad key 470 followed by a keying sequence to identify the axle number and the wheel number designated from the left side of the vehicle beginning at the front such that the wheel module number is removed from the queue and placed in memory 473. Once the wheel module number has been assigned to a position on the vehicle, the computer will proceed through an extraction procedure of the remaining information in the word to derive the input conditions contained in the word.

After the wheel module, wheel and tire have been installed on the vehicle, received transmissions that are demodulated and decoded are recognized by the wheel module number to permit the information contained in the word to be appropriately stored for that wheel location.

The pressure information contained in the received transmission is not temperature compensated; therefore, the temperature information contained in the received transmission is utilized to compensate 474 the pressure reading received in that same word. That is, the pressure sensed within the tire is encoded and transmitted without first compensating for the variation in pressure resulting from varying temperatures. Therefore, when the encoded pressure is transmitted and received, the receiving system first receives the pressure and then receives the indication of temperature to compensate the previously received pressure reading.

The temperature compensated pressure data is then converted from absolute pressure to gauge pressure 475 through the subtraction of the stored barometric pressure described above. The corrected and compensated pressure, now gauge pressure, is then stored by wheel module number 477. The stored data may be displayed by the operator by accessing the data with the keypad key Check Wheel Condition 480 to permit the information regarding that wheel to be displayed. A check of wheel module transmission reception 482 is made to confirm that all wheel modules are properly transmitting data. Under program control, a record of data reception from each wheel module is made, and if no reception is made within a programmed period of time from a specific module, an indication is provided to the operator that a particular module is not functioning. If Check Wheel Module Reception 482 receives no data from any wheel module, the indication is that all modules are off unless the system senses that the antenna is missing in which case the latter message takes priority and is displayed. Message displays to the operator are presented in order of priority. The first priority is for messages concerning major system malfunctions (those that result in incorrect information), second priority messages are those that relate to safety limit violations. Third level priority messages are those that relate to efficiency violations, and the forth priority is for minor system malfunctions (those that do not impact information accuracy). Multiple messages of equal priority are alternately displayed until resolved.

The stored data, stored by wheel module number is compared to numerous predetermined stored limits to provide information concerning the operation, condition and performance of the respective wheel and tire. That is, the data that is stored is compared to various limits to determine whether the pressure or the temperature or other parameters such as vibration, accelerations, etc., are within efficiency limits, in other words, while there is no catastrophic problem or safety issue, the tires or other components are wearing at a higher rate than they should be. Such inefficiency indications suggest that there may be a dragging brake, a lubrication problem, or a bearing may be approaching a high friction state and heating up. A comparison is also made to safety limits; that is, predetermined maximum temperatures and pressures as well as vibration or accelerations are made.

The limits for each parameter have been entered into the system through the keyboard keys 501–506 when the wheels and tires were installed on the vehicle and the limit information is stored 458. To simplify the description, the keyed information shown in FIG. 10 is represented as temperature and pressure although other parameters are entered into the system in the same manner. However, the pressure limits for the tire are usually those that are assigned by the manufacturer and refer to "cold pressure" which may be some standard ambient temperature. These pressure limits are not appropriate when the tire is under load and operating at highway speeds. It is therefore necessary to compensate the pressure limits for temperature. Thus, under computer program control, the temperature data in the stored wheel module data 477 is used to temperature adjust the pressure limit 457 for that tire and the resulting corrected pressure limit is stored 458.

FIG. 10 includes specific functional blocks relating to pressure and temperature efficiency and safety limits 485–488; to simplify the flow diagram, a functional block "compare to other limits" 490 is shown and is intended to indicate that similar comparisons to efficiency limits and safety limits are made in each instance for a sensed quantity. That is, vibration, acceleration, infrared, acoustic, or optical sensor readings are compared to efficiency ranges and limits and to safety limits.

To facilitate the description of these functional comparisons, reference will be made simply to the pressure comparisons, it being understood that similar comparisons to predetermined limits are made with respect to all of the sensed quantities. The data stored by word module number is accessed and the pressure sensor information is extracted and provided to comparitors 485 and 486. A comparison is first made in 485 to the efficiency limits for the designated wheel module. For example, the corrected gauge pressure may ideally be 100 psi but may be acceptable in the range of 90 to 110 psi. If the sensed pressure that is corrected and converted to gauge pressure falls within the acceptable efficiency range, no further action concerning the pressure reading is taken. If, however, the pressure reading falls outside of these efficiency limits, the fact of this condition is supplied to a data failure and identification analysis routine 492 where the date of failure, identification, and analysis of the failure takes place and the message representing a description of the problem is then supplied to the display. In addition, the failure of the sensed quantity to fall within the efficiency limits results in the energization of the alarm 493 which may be in the form of a light emitting diode which, in the case of an efficiency failure, will be energized continuously.

Having failed the efficiency comparison, the data is now subjected to a comparison with safety limits. For example, if the minimum temperature corrected tire pressure is, for example, 40 psig, and the sensed pressure is less, then a safety condition exists which could result in imminent tire failure with perhaps attendant vehicle control problems and possible serious damage to the vehicle. When safety violations of this sort are detected as a result of the comparison of the wheel module information to safety limits, the information is identified and then analyzed as described above and the appropriate message is presented on the display 500; in addition, the alarm 493 in the form of the previously constantly energized LED now assumes a flashing mode and, in certain instances, an aural alarm may be given to complement the warning light to emphatically instruct the operator to stop the vehicle as soon as driving conditions and traffic permit.

The operator can use the interval between the alarm indicating that an efficiency violation is occurring (e.g. a steady red lamp) and a safety limit violation (a flashing red lamp) to determine how rapidly the situation is degrading. Under program control the computer calculates and displays the time and distance to a forecast critical situation caused by the degrading measured quantity. For example, a detected falling pressure indication from a wheel module may indicate that the tire is likely to fail within a calculated time and distance; as described above, the greater the rate of pressure loss, the more frequently the parameter is sensed and the information transmitted to the receiving section of the system and hence the more frequently the calculation is made and the display updated.

The real time clock 496 is applied to several functions as a means of establishing a time basis for the occurrence of events. For example, a worst case pressure as well as a worst case temperature is detected when it occurs and are stored 497 and 498, respectively, together with a real time indication. The worst case temperature and pressure, as well as the worst case occurrence of any of the sensed quantities (which have been omitted from FIG. 10 for simplicity) provide a record of the highest and the lowest limits that the operator has set. For example, while there are standard factory limits for each of the detected or sensed quantities, and these limits are assigned, the operator may use keyboard keys 501 through 506 to reset the factory limits.

In addition to storing worst case conditions, any violations of the normal limits of the sensed quantity are stored as a number 499. The number of violations of limits is stored to be accessed externally for maintenance evaluation purposes. The operator is unable to access the store number of limit violations 499 but the number is accessible externally through the RS232 controller 510 through the connector 511. Thus, in the event a tire failed, the information relevant to that tire could be accessed through the connection 511 and determine how well that tire was maintained by detecting the number of times that the assigned limits were violated. For example, if a tire experienced a slow leak and the operator would merely continuously reinflate the tire and ignore the fact that the tire needed service, that fact would be evident by determining the number of limit violations over the lifetime of the tire. In other words, with respect to a particular tire the number of limit violations of temperature, pressure, vibration, etc., is available as an historical record to facilitate evaluation of the maintenance provided to the tire as well as the tire performance.

The limits for each of the detected or sensed quantities are also separately stored 515 and is available through the external access of the terminal 511 to confirm the limits to which the tire was subjected. For example, if there were a tire failure, an investigation through the RS232 port 511 could determine that the limits assigned to a particular tire were other than the factory recommended limits and therefore the operator's decision to use other limits may have been the source of the failure. The RS232 controller 510 operates with the terminal 511 as a two-way input/output between the on board computer and an outside interrogator. Messages can be sent that interrogate memory slots within the computer and provide information and also may be used to set factory limits in the system. The terminal is also used during initial installation for calibration and during fabrication of the computer's barometric sensors as well as the outside temperature sensor at the base of the antenna. The system can be operated through the port 511 in a manner very similar to that operation afforded to the operator through the key pad; however, it primarily offers access to stored information that is not available to the operator via the keypad and can display information such as worse case situation, highest and lowest limits, limit violations and other proprietary information that is stored in the computer. In the event the vehicle was involved in an accident, the investigator could interrogate the system to determine the conditions of the respective tires and wheels and what violations occurred of the sensed quantity limits and the values of the limits.

51

APPENDIX

APPENDIX

53
APPENDIX

54

APPENDIX

55

APPENDIX

APPENDIX

APPENDIX

APPENDIX

59

APPENDIX

60

APPENDIX

APPENDIX

APPENDIX

```
:2024C000000000000000000000000000000000FC
:2024E0000000000000000000000000000000000DC
:20250000000000000000000000000000000000BB
:202520000000000000000000000000000000009B
:20254000000000000000000000000000000000007B
:2025600000000000000000000000000000000005B
:2025800000000000000000000000000000000003B
:2025A00000000000000000000000000000000001B
:2025C0000000000000000000000000000000000FB
:2025E00000000000000000000000000000000000DB
:202600000000000000000000000000000000000BA
:2026200000000000000000000000000000000009A
:20264000000000000000000000000000000000007A
:2026600000000000000000000000000000000005A
:2026800000000000000000000000000000000003A
:2026A00000000000000000000000000000000001A
:2026C0000000000000000000000000000000000FA
:2026E00000000000000000000000000000000000DA
:20270000000000000000000000000000000000B9
:2027200000000000000000000000000000000000099
:202740000000000000000000000000000000000079
:202760000000000000000000000000000000000059
:202780000000000000000000000000000000000039
:2027A000000000000000000000000000000000019
:2027C0000000000000000000000000000000000F9
:2027E0000000000000000000000000000000000D9
:202800000000000000000000000000000000000B8
:202820000000000000000000000000000000000098
:202840000000000000000000000000000000000078
:202860000000000000000000000000000000000058
:202880000000000000000000000000000000000038
:2028A000000000000000000000000000000000018
:2028C0000000000000000000000000000000000F8
:2028E0000000000000000000000000000000000D8
:202900000000000000000000000000000000000B7
:202920000000000000000000000000000000000097
:202940000000000000000000000000000000000077
:202960000000000000000000000000000000000057
:202980000000000000000000000000000000000037
:2029A000000000000000000000000000000000017
:2029C0000000000000000000000000000000000F7
:2029E0000000000000000000000000000000000D7
:202A00000000000000000000000000000000000096
:202A20000000000000000000000000000000000076
:202A40000000000000000000000000000000000056
:202A60000000000000000000000000000000000036
:202A80000000000000000000000000000000000016
:202AA0000000000000000000000000000000000F6
:202AC0000000000000000000000000000000000D6
:202AE0000000000000000000000000000000000B6
:202B00000000000000000000000000000000000095
:202B20000000000000000000000000000000000075
:202B40000000000000000000000000000000000055
:202B60000000000000000000000000000000000035
:202B80000000000000000000000000000000000015
:202BA0000000000000000000000000000000000F5
:202BC0000000000000000000000000000000000D5
:202BE0000000000000000000000000000000000B5
:202C00000000000000000000000000000000000094
:202C20000000000000000000000000000000000074
:202C40000000000000000000000000000000000054
:202C60000000000000000000000000000000000034
:202C80000000000000000000000000000000000014
:202CA0000000000000000000000000000000000F4
:202CC0000000000000000000000000000000000D4
:202CE0000000000000000000000000000000000B4
:202D00000000000000000000000000000000000083
:202D20000000000000000000000000000000000093
:202D40000000000000000000000000000000000073
:202D60000000000000000000000000000000000053
:202D80000000000000000000000000000000000033
:202DA0000000000000000000000000000000000013
:202DC00000000000000000000000000000000000F3
:202DE00000000000000000000000000000000000B2
:202E00000000000000000000000000000000000092
:202E20000000000000000000000000000000000072
:202E40000000000000000000000000000000000BA
:202E60000000000000000000000000000000000052
:202E80000000000000000000000000000000000032
:202EA0000000000000000000000000000000000012
:202EC00000000000000000000000000000000000F2
:202EE00000000000000000000000000000000000B1
:202F00000000000000000000000000000000000002
:202F20000000000000000000000000000000000091
:202F40000000000000000000000000000000000071
:202F60000000000000000000000000000000000099
:202F80000000000000000000000000000000000051
:202FA0000000000000000000000000000000000031
:202FC0000000000000000000000000000000000011
:202FE0000000000000000000000000000000000F1
:0000001FF
```

What is claimed is:

1. A vehicle data collection system comprising:
   (a) wheel module means mounted on a vehicle wheel inside a tire mounted on said wheel including;
      i. a plurality of sensors each sensing a different vehicle operating parameter to provide an analog data signal representing said parameter;
      ii. means for digitizing said data signals;
      iii. microprocessing means connected to receive said digitized data signals and to encode such signals for transmission; said microprocessor responsive to the receipt of digitized data signals corresponding to a sensed parameter for;
         1. averaging a plurality of successive digitized data signals corresponding to said sensed parameter and storing said average;
         2. averaging a second plurality of successive digitized data signals corresponding to said sensed parameter and storing said average;
         3. averaging said first and second stored averages;
         4. comparing said first and second stored averages to detect any change in said sensed parameter;
         5. scheduling transmission of said data at predetermined intervals;
         6. reducing said predetermined interval if said change in said sensed parameter is greater than a predetermined percentage change;
      iv. a transmitter connected to receive encoded signals from said microprocessor and to transmit said encoded signals;
   (b) receiving means in said vehicle positioned remote from said wheel module for receiving said encoded data signals transmitted from said wheel modules;
   (c) computer means, connected to said receiving means, for receiving said data signals; and
   (d) display means connected to said computer for displaying said data.

2. The combination set forth in claim 1 wherein said sensed parameters include tire pressure and wheel temperature.

3. The combination set forth in claim 1 wherein said sensed parameters include axial and radial wheel acceleration.

4. The combination set forth in claim 1 wherein said sensed parameters include wheel vibration.

5. The combination set forth in claim 1 wherein said sensed parameters include infrared sensed tire temperature.

6. The combination set forth in claim 1 wherein said sensed parameters include sound.

7. A method of gathering vehicle data comprising;
   (a) sensing selected vehicle operating parameters from within a vehicle tire mounted on a wheel on said vehicle;
   (b) digitizing said data within said vehicle tire and transmitting, at predetermined intervals, said data outside said vehicle tire;
   (c) reducing said predetermined intervals if the sensed operating parameter changes by predetermined percentage;
   (d) receiving said data at a location remote from said vehicle tire;
   (e) comparing said data to predetermined limits for each of said selected vehicle operating parameters;
   (f) displaying said data; and
   (g) energizing an alarm if said data is outside a corresponding predetermined limit for any of said selected vehicle operating parameters.

8. The method of claim 7 wherein said selected vehicle operating parameters include tire pressure and wheel temperature.

9. The method of claim 7 wherein said vehicle operating parameters include axial and radial wheel acceleration.

10. The method of claim 7 wherein said selected vehicle operating parameters include wheel vibration.

11. The method of claim 7 wherein said selected vehicle operating parameters include infrared sensed tire temperature.

12. The method of claim 7 wherein said selected vehicle operating parameters include sound.

13. A method of collecting vehicle data comprising:
   (a) sensing a plurality of selected vehicle operating parameters from within a vehicle tire mounted on a wheel on said vehicle;
   (b) digitizing said data;
   (c) averaging a first plurality of successive digitized data signals corresponding to a sensed parameter and storing said average;
   (d) averaging a second plurality of successive digitized data signals corresponding to said sensed parameter and storing said average;
   (e) averaging said first and second stored averages;
   (f) comparing the first and second stored averages to detect any change in said sensed parameter;
   (g) scheduling transmission of said data at predetermined intervals;
   (h) reducing said predetermined interval if any such change in said sensed parameter is greater than a predetermined percentage change;
   (i) transmitting said average of averages;
   (j) receiving said data at a location remote from said vehicle tire;
   (k) comparing said data to predetermined limits for each of said selected vehicle operating parameters; and
   (l) energizing an alarm if said data is outside of a corresponding predetermined limit for any of said selected vehicle operating parameters.

14. The method of claim 13 wherein said selected vehicle operating parameters include wheel temperature and tire pressure.

15. The method of claim 13 wherein said selected vehicle operating parameters include axial and radial wheel acceleration.

16. The method of claim 13 wherein said selected vehicle operating parameters include wheel vibration.

17. The method of claim 13 wherein said selected vehicle operating parameters include infrared sensed tire temperature.

18. The method of claim 13 wherein said selected vehicle operating parameters include sound.

19. A vehicle data collection system comprising:
   (a) wheel module means mounted on a vehicle wheel including:
      (i) a plurality of sensors each for sensing a different one of selected vehicle operating parameters;
      (ii) digitizing means for digitizing data collected by said sensors;
      (iii) transmission means for transmitting said digitized data at predetermined intervals;
      (iv) an interval reducing means for reducing said predetermined intervals if the sensed operating parameter changes by a predetermined percentage;
   (b) receiving means in said vehicle mounted remote from said wheel module for receiving data transmitted from said wheel module;

(c) a computer means, connected to said receiving means for receiving said data, said computer means comparing each of said different one of said plurality of operating data to a corresponding plurality of predetermined limits respectively for said data;

(d) display means connected to said computer for displaying said data to an operator and for presenting an alarm when any of said plurality of data is outside a corresponding predetermined limit.

20. The combination set forth in claim 19 wherein said parameters include tire pressure and wheel temperature.

21. The combination set forth in claim 19 wherein said parameters include axial and radial wheel acceleration.

22. The combination set forth in claim 19 wherein said parameters include wheel vibration.

23. The combination set forth in claim 19 wherein said parameters include infrared sensed tire temperature.

24. The combination set forth in claim 19 wherein said parameters include sound.

25. A vehicle data collection system comprising:
   (a) wheel module means mounted on a vehicle wheel including:
      (i) a plurality of sensors each for sensing a different one of selected vehicle operating parameters;
      (ii) digitizing means for digitizing data collected by said sensors;
      (iii) transmission means for transmitting said digitized data at predetermined intervals;
      (iv) a interval reducing means for reducing said predetermined intervals if the sensed operating parameter changes by a predetermined percentage;
   (b) receiving means in said vehicle mounted remote from said wheel module for receiving data transmitted from said wheel module;
   (c) a computer means, connected to said receiving means for receiving said data and comparing the data to both predetermined efficiency limits with respect to each sensed operating parameter and to predetermined safety limits for each of said operating parameters;
   (d) display means connected to said computer for displaying said data to an operator and for presenting an alarm when any of said plurality of data is outside of said predetermined efficiency limits or outside of said predetermined safety limits.

26. The combination set forth in claim 25 wherein said parameters include tire pressure and wheel temperature.

27. The combination set forth in claim 25 wherein said parameters include axial and radial wheel acceleration.

28. The combination set forth in claim 25 wherein said parameters include wheel vibration.

29. The combination set forth in claim 25 wherein said parameters include infrared sensed tire temperature.

30. The combination set forth in claim 25 wherein said parameters include sound.

31. A vehicle data collection system comprising:
   (a) wheel module means mounted on a vehicle wheel inside a tire mounted on said wheel including:
      (i) a plurality of sensors each for sensing a different one of selected vehicle operating parameters;
      (ii) digitizing means for digitizing data collected by said sensors;
      (iii) transmission means for transmitting said digitized data at predetermined intervals;
      (iv) a interval reducing means for reducing said predetermined intervals if the sensed operating parameter changes by a predetermined percentage;
   (b) receiving means in said vehicle mounted remote from said wheel module for receiving data transmitted from said wheel module;
   (c) a computer means, connected to said receiving means for receiving said data, said computer means comparing each of said different one of said plurality of operating data to a corresponding plurality of predetermined limits respectively for said data;
   (d) display means connected to said computer for displaying said data to an operator and for presenting an alarm when any of said plurality of data is outside a corresponding predetermined limit.

32. The combination set forth in claim 31 wherein said parameters include tire pressure and wheel temperature.

33. The combination set forth in claim 31 wherein said parameters include axial and radial wheel acceleration.

34. The combination set forth in claim 31 wherein said parameters include wheel vibration.

35. The combination set forth in claim 31 wherein said parameters include infrared sensed tire temperature.

36. The combination set forth in claim 31 wherein said parameters include sound.

* * * * *